United States Patent [19]
Cavallaro

[11] Patent Number: 5,957,343
[45] Date of Patent: Sep. 28, 1999

[54] CONTROLLABLE LIQUID DISPENSING DEVICE

[75] Inventor: William Cavallaro, Bradford, Mass.

[73] Assignee: Speedline Technologies, Inc., Haverhill, Mass.

[21] Appl. No.: 08/885,005

[22] Filed: Jun. 30, 1997

[51] Int. Cl.⁶ .............................. B67D 3/00; G01F 11/28
[52] U.S. Cl. .......................... 222/504; 222/434; 222/438
[58] Field of Search .................................... 222/309, 434, 222/438, 439, 440, 451, 453, 504

[56] References Cited

U.S. PATENT DOCUMENTS

| | | |
|---|---|---|
| 1,184,779 | 5/1916 | Shaw . |
| 1,252,875 | 1/1918 | Ashmusen . |
| 1,699,236 | 1/1929 | Goldrick . |
| 2,274,241 | 2/1942 | Lemanski . |
| 2,410,516 | 11/1946 | Muller et al. . |
| 3,586,129 | 6/1971 | Cass . |
| 3,921,865 | 11/1975 | Klug . |
| 4,043,711 | 8/1977 | Seino . |
| 4,572,103 | 2/1986 | Engel . |
| 4,645,431 | 2/1987 | Spencer, et al. . |
| 4,646,969 | 3/1987 | Sorm et al. . |
| 4,708,269 | 11/1987 | Willerding ............................. 222/309 |
| 4,848,606 | 7/1989 | Tanguchi et al. . |
| 4,967,933 | 11/1990 | Maiorca et al. . |
| 4,974,755 | 12/1990 | Sonntag ................................. 222/309 |
| 5,044,900 | 9/1991 | Cavallaro . |
| 5,052,338 | 10/1991 | Maiorca et al. . |
| 5,110,615 | 5/1992 | Maiorca et al. . |
| 5,137,187 | 8/1992 | Nichols et al. ......................... 222/504 |
| 5,320,250 | 6/1994 | La et al. . |
| 5,465,879 | 11/1995 | La et al. . |
| 5,505,777 | 4/1996 | Ciardella et al. . |
| 5,666,325 | 9/1997 | Besler et al. . |
| 5,765,729 | 6/1998 | Miller et al. ............................ 222/504 |

FOREIGN PATENT DOCUMENTS

| | | |
|---|---|---|
| 684850 A5 | 1/1995 | Switzerland . |
| 114905 | 4/1918 | United Kingdom . |
| WO 97/13586 | 4/1997 | WIPO . |
| WO 97/18054 | 5/1997 | WIPO . |

OTHER PUBLICATIONS

Engel, Jack, Selecting The Proper Dispensing Tip, *Surface Mount Technology*, Oct. 1990.

Hogan, Brian, J. Adhesive Dispenser Provides ±2% Volume Repeatability, *Design News*, Apr. 11, 1994.

International Search ing Authority, *PCT Notification of Transmittal of International Search Report or the Declaration*.

*Primary Examiner*—Andres Kashnikow
*Assistant Examiner*—Keats Quinalty
*Attorney, Agent, or Firm*—Mintz, Levin, Cohn, Ferris, Glovsky and Popeo, P.C.

[57] ABSTRACT

A liquid dispensing system includes a selectively adjustable material control device and a sealing device within a dispensing device. The sealing device is in communication with a switching device to move the sealing device between a first position and a second position. The first position of the sealing device allows the material control device to draw a volume of material into the dispensing device and the second position of the sealing device allows the material control device to force the volume of material to dispense from the dispensing device.

21 Claims, 3 Drawing Sheets

CONTROLLABLE LIQUID DISPENSING DEVICE

FIELD OF THE INVENTION

The present invention relates to a dispensing device for various liquids, and more particularly to a liquid dispensing device which allows precise control over the amount of liquid dispensed.

BACKGROUND OF THE INVENTION

Several types of prior art dispensing systems are used for dispensing metered amounts of liquid or paste for a variety of applications. One such application is in the assembly of printed circuit boards and integrated circuit chips. Dispensing systems are used in this application for the process of encapsulating the integrated circuits with an encapsulant material and in the process of under filling flip integrated circuit chips with an encapsulant. Prior art dispensing systems are also used for dispensing dots or balls of liquid epoxy or solder onto circuit boards and integrated circuits. The liquid epoxy and solder is primarily used to connect components to a circuit board or within an integrated circuit. The dispensing systems described above include those manufactured and distributed by Camelot Systems, Inc., the assignee of the present invention under the name CAM/ALOT®.

In a typical dispensing system, a pump and dispenser assembly is mounted to a moving assembly for moving the pump and dispenser assembly along three mutually orthogonal axes (x, y, z), by servomotors controlled by a computer system or controller. To dispense a dot of liquid on a circuit board or some other substrate at a desired location, the pump and dispenser assembly is moved along the horizontal x and y axes until it is located over the desired location. The pump and dispenser assembly is then lowered along the vertical z axis until the nozzle is at an appropriate height over the substrate. The pump and dispenser assembly dispenses a dot of liquid, is then raised along the z axis, moved along the x and y axes to a next desired location, and is lowered along the vertical z axis to dispense the next liquid dot.

In dispensing applications such as the ones described above, the accuracy of the volume of liquid dispensed by the system is an important feature of the system. In one prior art dispensing system, the pump and dispenser assembly includes an auguring screw housed in an auguring chamber within a dispenser housing. The auguring screw is rotated within the chamber to provide a controlled amount of liquid. The pump and dispenser assembly has a nozzle for dispensing material onto a substrate. The liquid to be dispensed by the pump and dispenser assembly is contained in a vertical, cylindrical syringe supported to the dispenser housing by a bracket, the top of the syringe is covered by a top piece having clamps providing a pressure tight seal between the syringe and the top piece. The top piece includes an adaptor for coupling to an air line to receive pressurized air.

The prior art dispensing systems described above are effective in dispensing material onto a substrate, however, it is desirable to have a dispensing system having greater precision in controlling the amount of material to be dispensed.

SUMMARY OF THE INVENTION

Embodiments of the present invention provide an apparatus and method for dispensing a controlled amount of material onto a substrate.

In accordance with one embodiment of the present invention, a liquid dispensing system includes a material control device which cooperates with a switching device and a sealing device contained within a standard dispensing chamber. A standard power control system, such as a servomotor, in communication with the material control device, is used to selectively adjust the position of the material control device to dispense a controlled amount of material. When the sealing device is in a first position and the material control device is compressed a predetermined amount, a vacuum is created which draws material into the dispensing chamber. The material remains within the dispensing chamber as the sealing device in the first position seals an opening leading to a dispensing tip. After a predetermined amount of material is drawn into the dispensing chamber, the switching device moves the sealing device to a second position. This creates a seal to prevent further material from entering into the dispensing chamber. In this second position, the sealing device allows material to exit through the opening at the dispensing tip. By expanding the material control device, the material within the dispensing chamber is forced out the opening of the dispensing tip. In this manner, the precise amount of material to be dispensed onto the substrate can be controlled.

In another embodiment, the material control device includes a screw and piston system. The piston has an opening in one portion thereof to be received by the screw by corresponding engagement teeth. As the piston mates with the screw, it is drawn away from the dispensing chamber. The screw can be disengaged from the piston by a reverse turning action on the screw.

In another embodiment, the switching device is a pneumatic cylinder which is connected to the head of the sealing device which may protrude from the dispensing device.

In another embodiment, the dispensing device includes a retainer, having tapered edges to meet and seal with a first sealing portion of the sealing device when the sealing device is in the first position.

In another embodiment of the present invention, the switching device has a failsafe position to prevent leaks of material from the dispensing device by ensuring that the sealing device remains in a closed position over the dispensing tip.

In yet another embodiment, an adjustment means is provided at the base of the dispensing chamber which allows for adjusting the length of the opening for the dispensing tip.

BRIEF DESCRIPTION OF THE DRAWINGS

For a better understanding of the present invention, reference is made to the drawings which are incorporated herein by reference and in which.

DETAILED DESCRIPTION

For purpose of illustration, the present invention will now be described with reference to a dispensing system which is used to dispense viscous materials onto a substrate. One skilled in the art will appreciate, however, that embodiments of the present invention are not limited to dispensing systems that dispense viscous materials onto substrates, but rather, the dispensing apparatus and methods in accordance with the embodiments of the present invention may be used in other applications requiring dispensing of a controlled amount of material from a container.

Figure 1:
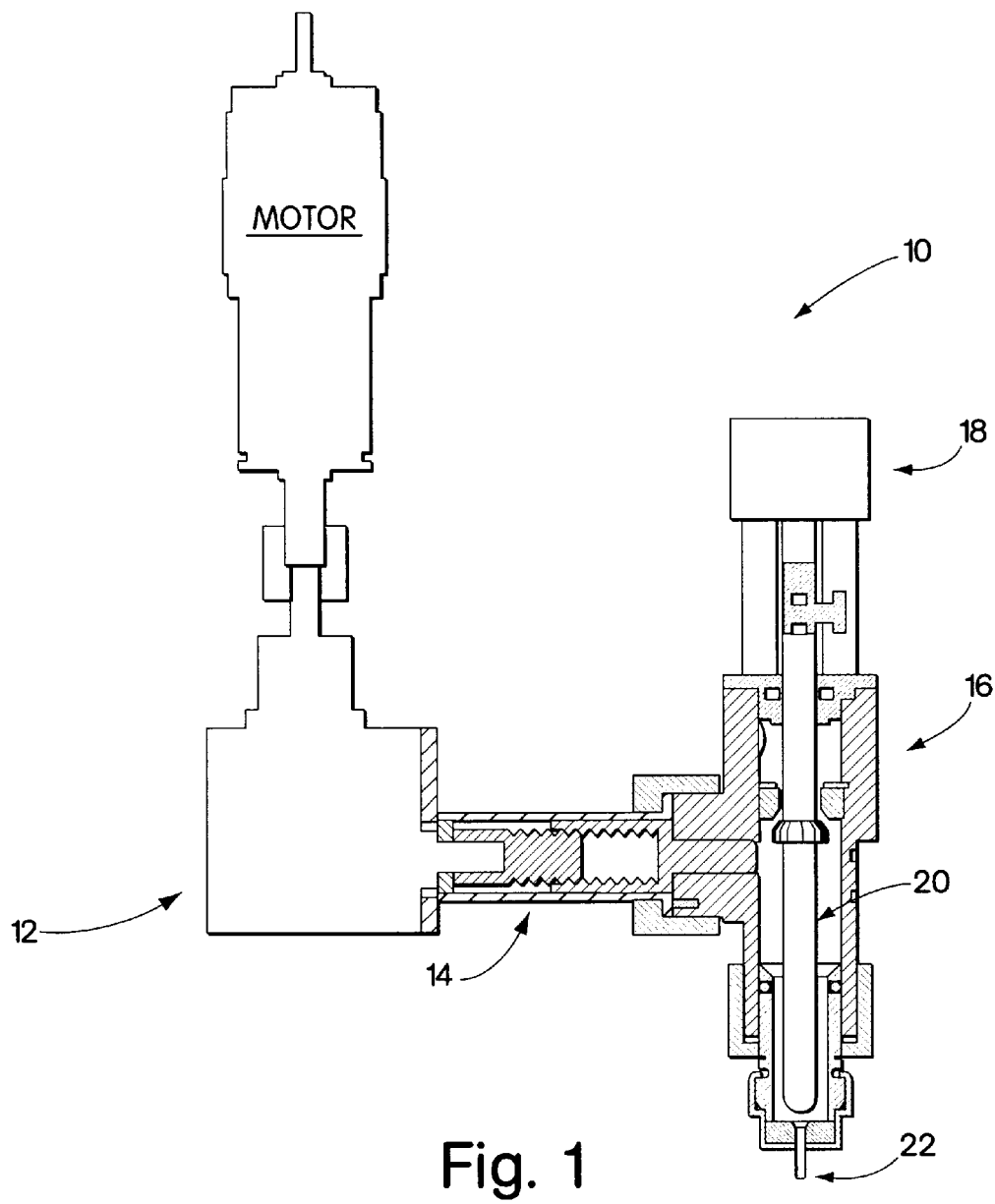
FIG. 1 is a drawing of the dispensing system in accordance with one embodiment of the present invention.

Referring now to FIG. 1, a controllable liquid dispensing system 10 in accordance with one embodiment of the present invention is shown. The liquid dispensing system 10 comprises a power control system 12 connected with a material control device 14 which is connected to a dispenser device 16. The material control device 14 cooperates and interacts with the dispenser device 16 to deliver a controlled volume of material through a dispensing tip 22 and onto a substrate (not shown). Within the dispensing device 16, there is present a sealing device 20 which is connected to a switching device 18. By means of standard timing and control systems known in the art, the switching device can move the sealing device 20 from a first position which allows material to enter into the dispensing chamber, but not exit the dispensing tip 22; and into a second position in which material is prevented from entering into the dispensing chamber, but may exit through the dispensing tip 22. The material is drawn into the dispensing chamber when the sealing device is in the first position by a vacuum created in the dispensing chamber by the material control device. The power control system 12 is a standard control system as is known in the art and is coupled to the material control device 14 to selectively determine the volume of material to be drawn into the chamber by displacing the material control device a selected distance. Once the material is drawn into the dispensing chamber, the switching device 18 moves the sealing device 20 to a second position. The material control device 14 is then returned to its original position forcing the material from the dispensing chamber through the dispensing tip 22 and onto the substrate.

Figure 2:
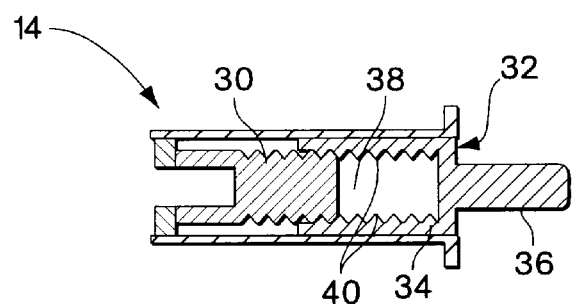
FIG. 2 is a cross-sectional view of a material control device used in embodiments of the present invention.

Referring now to FIG. 2, the material control device 14 can be seen in greater detail. In one embodiment, the material control device 14 comprises a screw 30 and a piston 32. Preferably, self lubricating materials and a fine threaded screw for greater control of piston movement are used. The piston 32 may comprise a first portion 34 and a second portion 36. The first portion 34 defines an opening 38 containing engagement teeth 40 to receive and mate with the screw 30. The second piston portion 36 extends into the material control device chamber 58 (See FIG. 3). In a preferred embodiment, a piston with a diameter of 0.250 inches is used. However, smaller or larger diameters may be used depending upon the volume of material to be dispensed. Self lubricating and abrasive resistant materials are preferred.

By connecting the material control device 14 to a standard power control system, such as a servomotor, the rotation of the screw 30 can be controlled so that when the screw mates with the piston 32, the second piston portion 36 is drawn away from the dispensing chamber and back through the material control device chamber 58 to create a vacuum within the chambers. The displacement distance of the second piston portion 36 can be controlled by the number of turns made to the screw 30. By controlling the distance of displacement of the piston portion 36, it controls the amount of vacuum created in the chamber 58 and dispensing chamber 52. This in turn determines the amount of material which is drawn into the dispensing device 16 as will be shown herein.

Figure 3:
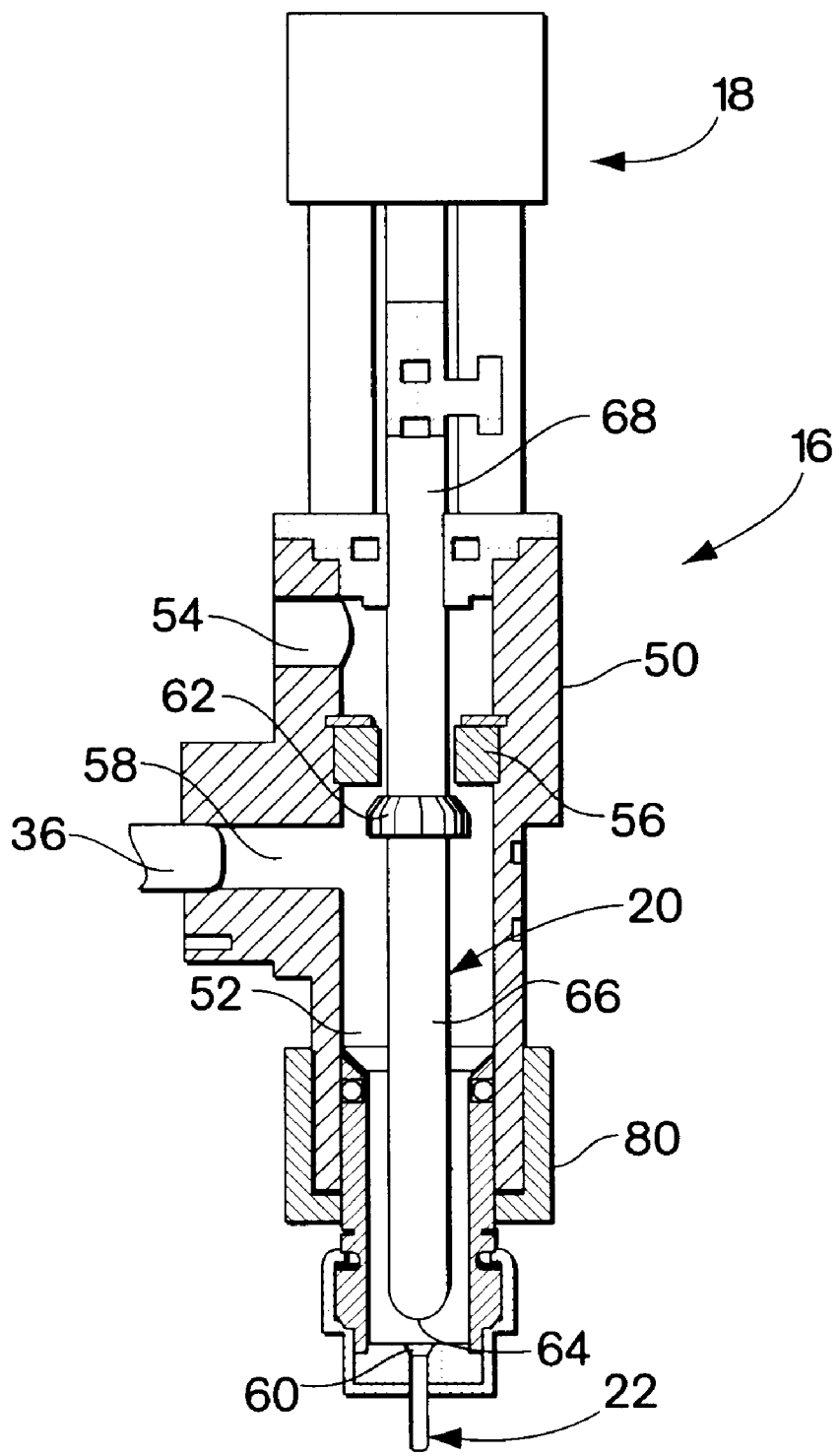
FIG. 3 is a cross-sectional view of a dispensing device and a switching device used in embodiments of the present invention.

Referring now to FIG. 3, the dispensing device 16, switching device 18 and sealing device 20 of the present invention are shown in greater detail. The dispensing device 16 comprises a housing 50 which defines a chamber 52 for receiving material from an opening 54 which is to be dispensed through a second opening 60 and into a dispensing tip 22. Extending the length of the chamber 52 is the sealing device 20. The sealing device 20 includes a first sealing portion 62 and a second sealing portion 64 connected by interconnect arm 66. The entire sealing device 20 is in connection with the switching device 18. The switching device 18 may be implemented using a common switch or preferably a pneumatic cylinder which can be controlled through standard control systems that are known in the art. The switching device 18 could also be driven from a cam, a wedge or rack and pinion, or a motor and screw, similar to the device shown in FIG. 2. The sealing device 20 can be made from a range of material. For dispensing of abrasive materials, the sealing device may be made from tungsten carbide, ceramic, or other hard materials (or a combination of the above). For non abrasive materials, a stainless steel or other suitable material may be used.

It is preferred that the first sealing portion 62 of the sealing device 20 be located in a position which separates the opening 54 for the material entrance into the chamber 52 from the material control device chamber 58 and the material control device 14. In this manner, the first sealing portion 62 can create a seal between the material entrance opening 54 and the material control device chamber 58. In one embodiment, a retaining device 56 may be placed in the chamber 52 to assist in creating the seal with the first sealing portion 62 and also to prevent the first sealing portion 62 from rising to the level of the material entrance opening 54. The retaining device 56 may have tapered edges to assist in the sealing process. The retaining device may be any of those known in the art. The first sealing portion 62 may also be a ball and check valve or one of other similar sealing devices known in the art.

The sealing device 20 has a second sealing portion 64 connected by an interconnect arm 66 to the first sealing portion 62. This second sealing portion 64 seals the opening above the dispensing head or tip 22 to prevent material from dispensing from the chamber 52. The first sealing portion 62, second sealing portion 64 and interconnect arm 66 act in cooperation with each other so that when the switching device 18 moves the sealing device 20 from a first position to a second position, one of the seals created by either the first sealing portion 62 or the second sealing portion 64 is in an open position and the other seal is in a closed position.

The dispensing device 16, switching device 18 and material control device 14 can all be assembled and connected through various fastening means known in the art such as clamps, screws, bolts, pins, etc. In this manner, the entire assembly allows for easy construction, repair and cleaning.

In an alternative embodiment, an adjustment device 80 can be placed at the base of the dispensing device 16. The adjustment device allows for changes in the opening length for larger volumes of fluid flow. The adjustment device 80 can comprise various known devices in the art such as screw on fasteners, twist caps, etc.

Figure 4C:
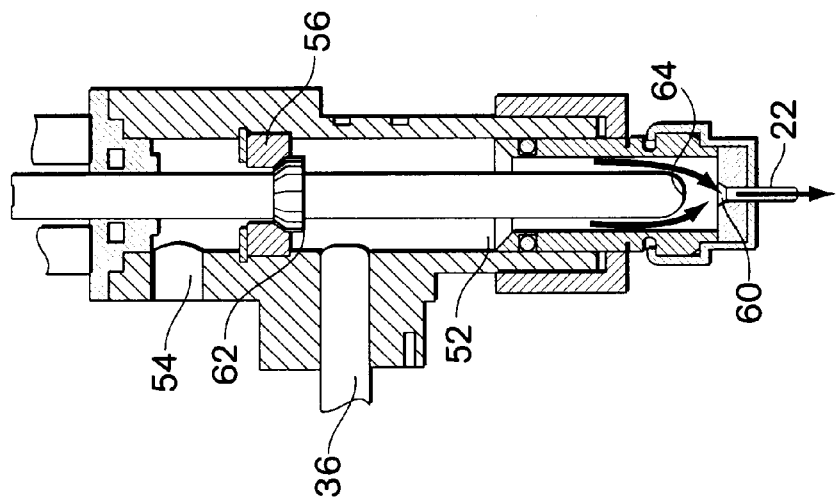
FIG. 4C illustrates the material control device and the sealing device cooperating in a second position to force material through a dispensing opening in the dispensing device.
Figure 4B:
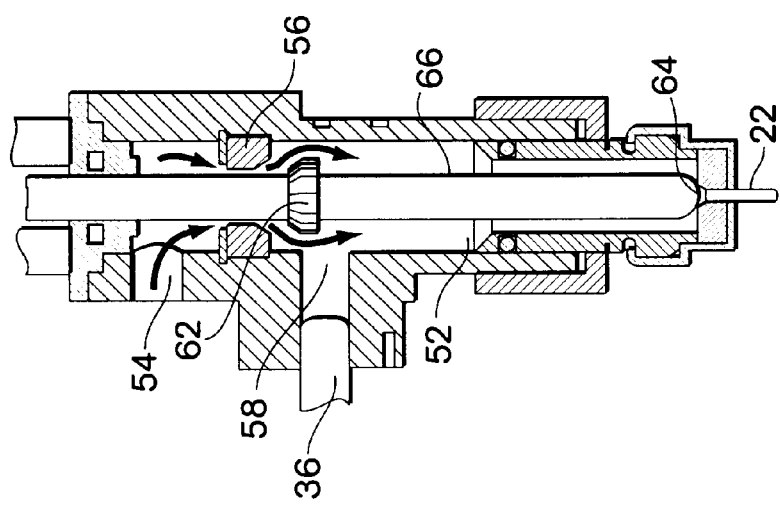
FIG. 4B illustrates the sealing device and material control device cooperating in a first position to draw material into the dispensing device.
Figure 4A:
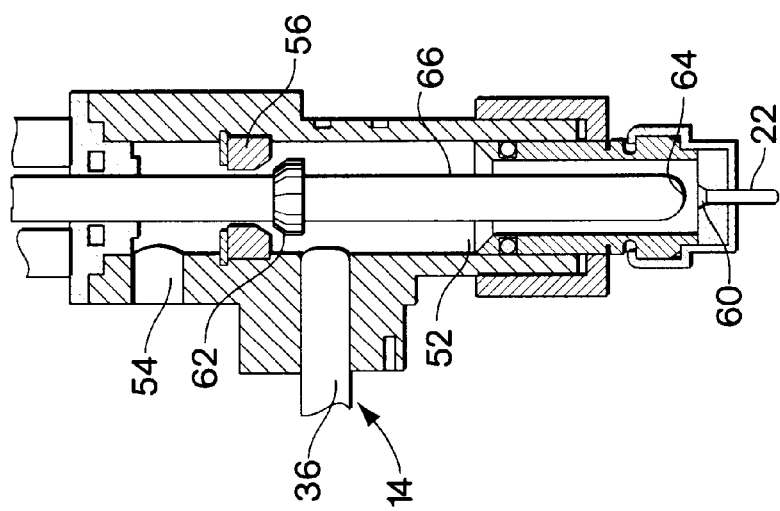
FIG. 4A illustrates a sealing device used in embodiments of the present invention in an initial purge position.

Referring now to FIGS. 4A, 4B and 4C, the liquid dispensing device 10 of the present invention can be shown in operation. FIG. 4A illustrates the initial purge position of the dispensing device 10 before any material is entered into the chamber 52. A simple spacer device (not shown) is placed between the switching device 18 and the dispensing device 16. In doing so, this leaves the sealing device 20 in a half open/half closed position. The first sealing portion 62 and the second sealing portion 64 do not complete or form seals anywhere within the chamber 52. In this manner, material to be dispensed can be sent into the chamber 52 through opening 54 and pass through the entire length of the chamber 52 and exit through the dispensing tip 22 via opening 60. This process purges any air from the chamber prior to dispensing.

After the initial purge is complete, the switching device 18 brings the sealing device 20 to the first position where the second sealing portion 64 seals the opening 60 over the dispensing tip 22. In this position, the first sealing portion 62 does not form a seal and therefore allows an open pathway for material flow from the material opening 54 and into the lower portion of the chamber 52. When the sealing device 20 is in this position, the material control device 14 is compressed a predetermined distance by the power control 12. This creates a vacuum to draw material through the material opening 54 and material supply (not shown) into the chamber 52. The liquid material can flow past the sealing device first portion 62 and past the retainer 56 and into the lower area of the chamber 52. Once the selected volume of material enters into the lower portion of chamber 52, the material cannot escape from the dispensing device 16 since the opening 60 for the dispensing tip 22 is sealed by second sealing portion 64. Using standard timing and control systems known in the art, the switching device 18 moves the sealing device 20 to the second position after the volume of liquid has passed the first sealing portion 62. In this manner, the second sealing portion 64 is removed from the dispensing opening 60 which can allow for the material to escape and be dispensed onto the substrate (not shown). When the sealing device 20 and first sealing portion 62 are in the second position, the material control device 14 is returned to its initial position through the power control 12, preferably in the form of a servomotor. This returning force from the piston 36 and material control device 14 forces the liquid in the chamber 52 to be pushed through opening 60 and through dispensing tip 22 onto a substrate. The interaction of the material control device 14, the switching device 18 and the sealing device 20 allows for a distinct metered amount of liquid or paste to be provided to the substrate or depositing surface in a controlled manner.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only. It is not intended as limiting. The invention's limit is defined only in the following claims and the equivalents thereto.

What is claimed is:

1. A liquid dispensing system comprising:
   a housing having an inner chamber;
   a material control device that is movable to draw a predetermined quantity of dispensing material into the inner chamber and to force the dispensing material from the inner chamber;
   a switching device;
   a sealing device disposed within the inner chamber and in communication with said switching device to move said sealing device between a first position, a second position, and a third position;
   said first position of said sealing device allowing said material control device to draw a volume of material into said inner chamber;
   said second position of said sealing device allowing said material control device to force said volume of material from said inner chamber; and
   said third position of said sealing device allows purging of air from the liquid dispensing system prior to dispensing.

2. A dispensing system for dispensing a volume of material, the dispensing system comprising:
   an inlet to receive the material to be dispensed from the dispensing system;
   an outlet from which material is dispensed;
   a housing;
   a piston disposed within the housing and movable between a first position and a second position, the piston defining an inner chamber within the housing for containing the material, a volume of the inner chamber being variable based on a position of the piston within the chamber; and
   a sealing device that selectively seals the inlet and the outlet, the sealing device being movable between a first position at which material is allowed to enter the inner chamber through the inlet, a second position at which material is allowed to exit the inner chamber through the outlet, and a third position at which material is allowed to enter the inner chamber through the inlet and exit the inner chamber through the outlet to allow priming of the dispensing system.

3. The dispensing system of claim 2, wherein the sealing device is constructed and arranged such that in the first position material is prevented from exiting the outlet, and in the second position, material is prevented from entering the inlet.

4. The dispensing system of claim 3, wherein the dispensing system is controllable such that the piston moves from the first position to the second position after the sealing device has been moved to the first position to expand the volume of the inner chamber to draw material into the inner chamber through the inlet.

5. The dispensing system of claim 4, wherein the dispensing system is controllable such that the piston moves from the second position to the first position after the sealing device has been moved to the second position to decrease the volume of the inner chamber to force material from the outlet.

6. The dispensing system of claim 5, further comprising a first actuator that moves the piston between the first and second positions and a second actuator that moves the sealing device between the first and second positions.

7. The dispensing system of claim 6, wherein the position of the piston within the housing at each of the first and second positions is adjustable to vary the volume of the inner chamber to vary the volume of material dispensed from the dispensing system.

8. The dispensing system of claim 7, wherein the sealing device is movable to a third position at which material is allowed to enter the inner chamber through the inlet and exit the inner chamber through the outlet to allow priming of the dispensing system.

9. The dispensing system of claim 8, wherein the sealing device includes an elongated cylindrical arm having a first end and a second end, the first end being adapted to seal the outlet when the sealing device is in the first position and the second end being adapted to mate with the second actuator.

10. The dispensing system of claim 9, wherein the sealing device further includes a sealing portion disposed between the first end and the second end that is adapted to seal the inlet when the sealing device is in the second position.

11. The dispensing system of claim 2, wherein the dispensing system is controllable such that the piston moves from the first position to the second position after the sealing device has been moved to the first position to expand the volume of the inner chamber to draw material into the inner chamber through the inlet.

12. The dispensing system of claim 2, wherein the dispensing system is controllable such that the piston moves from the second position to the first position after the sealing device has been moved to the second position to decrease the volume of the inner chamber to force material from the outlet.

13. The dispensing system of claim 2, further comprising a first actuator that moves the piston between the first and second positions and a second actuator that moves the sealing device between the first and second positions.

14. The dispensing system of claim 2, wherein the position of the piston within the housing at each of the first and second positions is adjustable to vary the volume of the inner chamber to vary the volume of material dispensed from the dispensing system.

15. The dispensing system of claim 2, wherein the sealing device includes an elongated cylindrical arm having a first end and a second end, the first end being adapted to seal the outlet when the sealing device is in the first position and the second end being adapted to mate with the second actuator.

16. The dispensing system of claim 15, wherein the sealing device further includes a sealing portion disposed between the first end and the second end that is adapted to seal the inlet when the sealing device is in the second position.

17. A method of dispensing a volume of material from a dispensing system having an inner chamber with an adjustable volume, the inner chamber having an inlet to receive the material and an outlet from which the material is dispensed, the method comprising steps of:

opening the inlet and the outlet to allow material to flow through the dispensing system to purge air from the chamber;

closing the outlet to prevent material from exiting the outlet;

increasing the volume of the inner chamber to draw material into the inner chamber through the inlet;

closing the inlet;

opening the outlet; and decreasing the volume of the inner chamber to dispense the material from the outlet.

18. The method of claim 17, wherein the step of increasing the volume includes a step of creating at least a partial vacuum within the inner chamber to draw the material into the inner chamber.

19. The method of claim 18, wherein:

the step of increasing the volume includes a step of increasing the volume by a predetermined amount; and the step of decreasing the volume includes a step of decreasing the volume by the predetermined amount so that the volume of the material dispensed is equal to the predetermined amount.

20. A dispensing system for dispensing a volume of material, the dispensing system comprising:

an inlet to receive the material to be dispensed from the dispensing system;

an outlet from which material is dispensed;

a housing having an inner chamber, coupled to the inlet and the outlet, having a volume;

means for purging air from the inner chamber;

means for increasing the volume of the inner chamber to draw material into the inner chamber through the inlet; and means for decreasing the volume of the inner chamber to dispense material through the outlet.

21. The dispensing system of claim 20, wherein the means for purging includes means for simultaneously opening the inlet and the outlet to allow material to flow from the inlet through the chamber and out of the outlet.

* * * * *